United States Patent [19]

Eikelmann et al.

[11] Patent Number: 5,515,470
[45] Date of Patent: May 7, 1996

[54] PROCESS FOR RECONSTRUCTING A PICTURE COUPLED INTO A FIBER OPTICAL BUNDLE MADE OF OPTICAL FIBERS

[75] Inventors: Eckard Eikelmann, Würselen; Stefan Keller; Tilo Pfeifer, both of Aachen, all of Germany

[73] Assignee: Fraunhofer-Gesellschaft zur Forderung der angewandten Forschung e.V., Munich, Germany

[21] Appl. No.: 351,016

[22] Filed: Dec. 7, 1994

[51] Int. Cl.[6] ..................................................... G02B 6/06
[52] U.S. Cl. ......................... 385/116; 250/227.2; 356/124
[58] Field of Search ........................... 385/115–121, 147; 250/227.2, 227.27–227.29; 356/73.1, 124, 124.5, 128

[56] References Cited

U.S. PATENT DOCUMENTS

| | | | |
|---|---|---|---|
| 4,601,537 | 7/1986 | Saccocio | 385/115 X |
| 4,674,834 | 6/1987 | Margolin | 385/121 |
| 4,762,391 | 8/1988 | Margolin | 385/119 |
| 4,812,646 | 3/1989 | Waszkiewicz | 250/227.2 |
| 5,155,790 | 10/1992 | Hwang | 385/121 |
| 5,313,542 | 5/1994 | Castonguay | 385/115 |
| 5,327,514 | 7/1994 | Dujon et al. | 385/115 |

FOREIGN PATENT DOCUMENTS 4042317  2/1992  Germany.

*Primary Examiner*—John D. Lee
*Attorney, Agent, or Firm*—Popham, Haik, Schnobrich & Kaufman, Ltd.

[57] ABSTRACT

A process for reconstructing a picture coupled into a fiber optical bundle (1) comprising optical fibers (2) is provided. It is immaterial for this process whether the optical fibers (2) are parallel or totally random in the fiber optical bundle (1). The prerequisite is that the launching sided and output sided coordinates of each optical fiber (2) are known.

The picture coupled into the launching side (3) is reconstructed with the aid of the gray tones passed on by the optical fibers (2) to the output side (4). To this end a grid (5), comprising grid field (6) that are connected together without any gaps, is laid over the launching sided arrangement of the optical fibers (2). Assigned to each grid field (6) is a gray tone, which comprises through addition fractions of the output sided, average gray tones of all of the optical fibers (2), which are at least partially overlapped by the grid field (6), whereby such a fraction corresponds to the percentage of the area of the optical fiber overlapped by the grid field (6) to the total cross sectional area of the optical fiber (2). The grid (5) provided with gray tones is finally reproduced on a video screen.

19 Claims, 1 Drawing Sheet

PROCESS FOR RECONSTRUCTING A PICTURE COUPLED INTO A FIBER OPTICAL BUNDLE MADE OF OPTICAL FIBERS

The invention relates to a process for reconstructing a picture, coupled into a fiber optical bundle, which exhibits a launching side and an output side and is made of optical fibers, whereby the launching sided and the output sided coordinates of each individual optical fiber are known and can be assigned to each other.

When a fiber optical bundle comprising parallel optical fibers is used, a picture, which is coupled in optically on the launching side of the fiber optical bundle, can be reconstructed in that during the coupling-in operation the output side of the fiber optical bundle is reproduced. For example, owing to the production tolerances, however, the parallelism of the optical fibers can be disturbed, so that the optical fibers on the output side exhibit a somewhat different configuration than on the launching side. Thus, when the picture is reproduced by means of reproduction on the output side, picture defects can occur.

Such a process for reproducing a picture, using fiber optical bundles with non-parallel optical fibers is totally inadequate, since then the positions of the individual optical fibers on the launching and output side are usually so different that an unrecognizable or at least highly distorted picture would be reproduced.

A process is known from the DE 40 42 317 A1, where in the case of fiber optical bundles comprising non-parallel optical fibers the coordinates of the respective optical fibers on the launching side and on the output side can be defined and assigned to each other. In the cited document it is not disclosed, however, whether and, if so, how a picture coupled in on the launching side can be reconstructed with the aid of the light signals received on the output side.

The object of the present invention is to provide a process of the aforementioned kind, with which a qualitatively high grade picture can be reconstructed.

This problem with a process of the aforementioned kind is solved according to the invention in that, when the picture is coupled in, the output side is taken by a camera, exhibiting a sensor area with discrete sensor elements; that a grid, comprising grid fields that are connected together without any gaps, is laid over the launching sided configuration of the optical fibers; that the gray tones, which are picked up by the sensor elements and relate to an optical fiber, are distributed in such a manner on the grid fields overlapping with this optical fiber that each of these grid fields obtains from a gray tone, whose average is formed via at least one part of the output sided fiber cross section of said optical fiber, a gray tone percentage, which corresponds to the area percentage of the area, overlapped by the respective grid field, at the fiber cross sectional area; that a grid field gray tone is found by adding all of the gray tone percentages of a grid field; and that the grid with the grid field gray tones is reproduced via a video screen.

The grid, which is reproduced on the video screen and provided with the gray tones, represents a high grade reconstruction of the coupled-in picture. At the same time the picture can be reproduced in video real time, so that even moving pictures can be transmitted in high quality by way of the fiber optical bundle.

In principle, the process according to the invention utilizes the circumstance that the launching sided and the output sided coordinates of each optical fiber are known with high accuracy. Thus, it is possible to assign to the individual optical fibers on the launching side the gray tone determined on the output side.

The process according to the invention can also be implemented in such an advantageous manner that first a gray tone, whose average is formed via at least one part of the output sided fiber cross section, is determined in order to distribute the gray tones, which are picked up by the sensor elements and relate to an optical fiber, on the grid fields overlapping with the optical fiber; and the gray tone percentages of the grid fields are defined as fractions of the averaged gray tone, whereby such a fraction is given by the quotient from the area, overlapped by the respective grid field, to the total cross sectional area of the fiber.

Thus, the average gray tone, defined at the output end for the optical fiber concerned, is assigned to each optical fiber in the launching sided configuration. To define this average gray tone, it can be advantageous to consider only the sensor elements, which pick up the light from a central region of the optical fiber, since the outer regions of the optical fibers are usually comparatively dark. The average gray tone of an optical fiber is then distributed in proportion to the area over the grid fields, which overlap with this optical fiber when screening.

Furthermore, it is advantageous to implement the process according to the invention in such a manner that a grid field area is chosen whose amount corresponds to the fiber sectional area.

Grid fields in this order of magnitude are so large on the one hand that even if the launching sided configuration of the optical fibers is not totally densely packed, at least almost all of the grid fields overlap with optical fiber cross sections. Thus, abrupt gray tone transitions, as in the case between two launching sided, adjacent optical fibers, are weakened. Moreover, the dark edges of the optical fibers are not shown.

On the other hand, the grid fields selected thus are small enough to maintain in essence the resolution capacity of the optical fibers.

However, the process according to the invention can also be implemented in such a manner that the grid comprises grid fields, whose size and shape correspond to the sensor elements in consideration of the reproduction scale.

This modification of the process according to the invention provides a reproduction of the launching sided configuration of the optical fibers, whereby the individual optical fibers exhibit a uniform gray tone, which corresponds to the output sided gray tone of the corresponding optical fiber, the average of said gray tone having been been determined. Thus, the coupled-in picture is also reconstructed, whereby the structure of the cross section of the fiber optical bundle is imposed on this representation.

The process according to the invention can also be implemented in such a manner that the individual gray tones, which are picked up by the sensor elements and relate to an optical fiber, are assigned directly to the grid fields overlapping with this optical fiber; and the gray tone percentages of the respective grid fields are determined by adding the gray tones assigned to the respective grid fields.

Thus, a picture can be reconstructed very quickly, since in this case the definition of the output sided average gray tones of the optical fibers is avoided.

In so doing, it must be clear before the picture is transmitted, to which grid field, overlapped by an optical fiber, the gray tone of a specific sensor element, picking up the light of this optical fiber, is assigned. Thus, the gray tone percentage, which the grid field receives from the said optical fiber, comprises the assigned gray tones. At the same time the goal is that this gray tone percentage is a fraction of the output sided, average gray tone of the optical fiber;

and the fraction corresponds to the quotient from the area overlapped by the grid field to the total fiber cross sectional area.

Since the screening is specified, it is known for all picture transmissions how large the percentage of the area that is overlapped by a grid field to the total fiber cross sectional area is. Thus, it is also known which fraction of an averaged gray tone has to be assigned to a grid field. The allocation can then be done during transmission of a picture, for example, in such a manner that of all of the sensor elements evaluating an optical fiber a number is chosen that corresponds to this fraction and whose gray tones are assigned directly to the grid field defining the said fraction during the transmission of the picture.

However, one must pay attention to the typically non-uniform distribution of intensity over the cross section of an optical fiber. Therefore, it can be advantageous to treat not every sensor element as equal with respect to the gray tone distribution. Rather it is logical to weigh the individual sensor elements according to their position relative to the optical fiber and thus in accordance with their informational content and to take this into consideration when determining the number of sensor elements relevant for a grid field.

The process according to the invention can also be implemented in such a manner that the gray tone of the dark spots generated on the launching side by a non-ideal packing of the optical fibers is increased.

Finally, it can be advantageous to implement the process of the invention in such a manner that during reproduction on the video screen one grid field corresponds exactly to one picture element.

In the following description, one method of carrying out the process according to the invention is presented with references to the figures in which.

Figure 1:
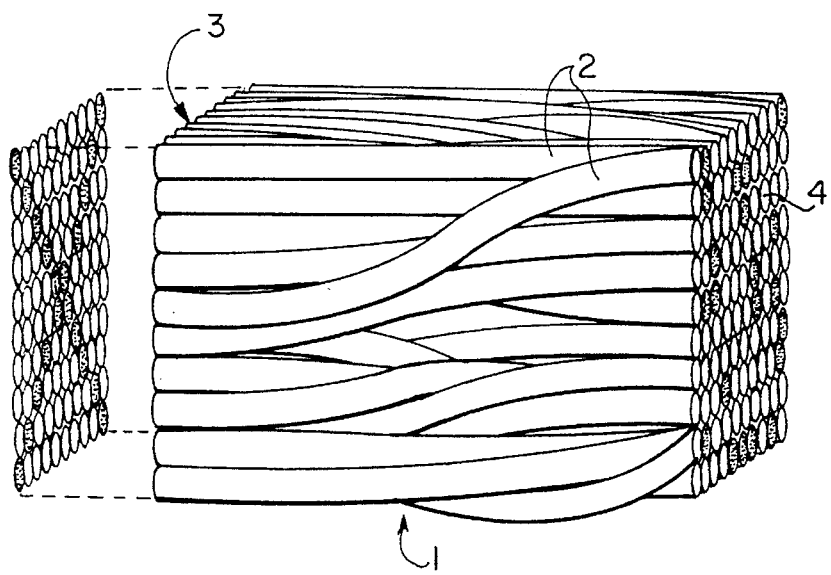
FIG. 1 is a schematic view of a fiber optical bundle with non-parallel optical fibers.

FIG. 1 is a schematic drawing of a fiber optical bundle 1, whose optical fibers 2 are arranged differently on the launching side 3 and on the output side 4. Without any additional measures a picture coupled into the launching side 3 can be reproduced by the output side 4 only with grave picture defects, which may render the picture unrecognizable.

For the process according to the invention one proceeds from the hypothesis that for a fiber optical bundle 1 with non-parallel optical fibers 2 the launching side and the output side coordinates of each optical fiber 2 are known and assigned to each other in a table.

If at this stage the picture is coupled into the launching side 3, the output side 4 is projected simultaneously on the sensor area of a camera (not illustrated here). In so doing, the individual sensor elements of the camera should be clearly smaller in their expansion than the projected optical reproduction of an optical fiber cross section, since then the light from an optical fiber 2 is determined by several sensor elements and thus adequate resolution is guaranteed. With the aid of the camera the output sided gray tone, whose average is formed via a central region of the fiber cross section, is defined for each optical fiber 2. Then a reproduction of the optical fibers 2 is produced in the launching sided arrangement by describing circles with the diameter of the optical fibers 2 around the known launching sided coordinates and assigning the averaged gray tone, found on the output side 4, to the optical fiber cross sections. The latter is done with the aid of the aforementioned allocation table for the launching sided or output sided coordinates of the optical fibers 2. Reproduced by a video screen, this reproduction represents simultaneously a reconstruction of the picture that is coupled in.

As evident with the aid of the drawing of the launching side 3 in FIG. 1, the structure of the fiber optical bundle cross section is imprinted on the picture that is coupled in, so that, when the picture is reconstructed according to the method described above, the picture is reproduced by means of round picture segments, which are separated from each other by dark borders.

Figure 2:
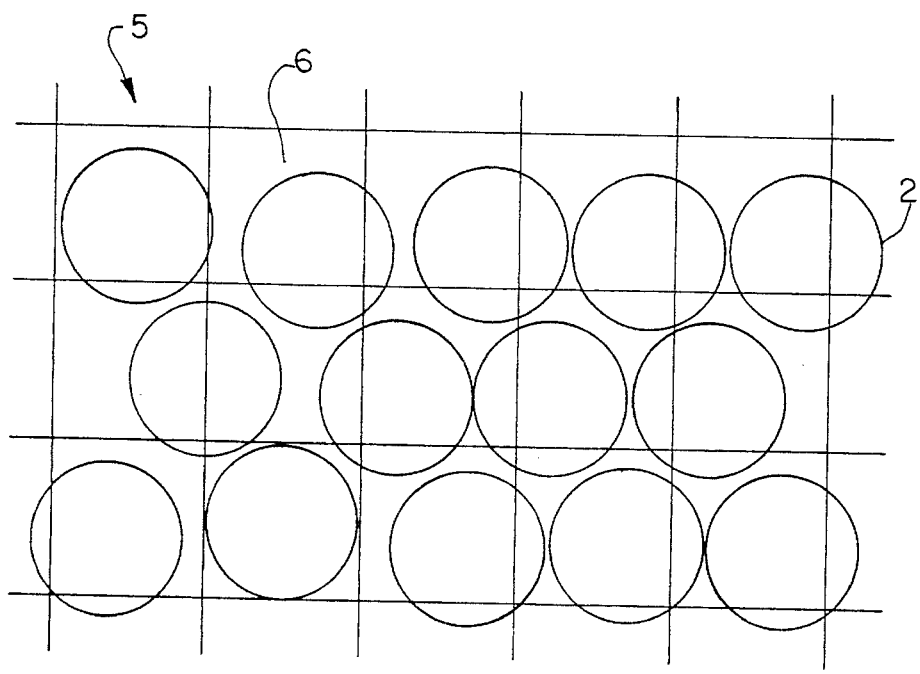
FIG. 2 is a schematic view of the screening of the optical fibers in the launching sided arrangement.

In the following it is explained how the quality of the picture reconstruction can be increased by means of a grid 5, which is superimposed on the launching sided arrangement of the optical fibers 2 (FIG. 2). During the screening operation, the cross section of the optical fibers 2 overlaps parts of at least one grid field 6. To reconstruct a picture, the output sided gray tones of the optical fibers 2 are distributed over the grid fields 6, the average of the gray tones having been determined to achieve this, that fraction of the gray tone that corresponds to the quotient of the overlapped area to the cross sectional area, is assigned to each grid field 6 by each optical fiber 2 whose cross section partially overlaps the grid field 6. Then the allocated gray tone percentages are added for each grid field 6.

Now the grid fields 6 can be reproduced with their gray tones by way of a video screen, whereby it is possible to reconstruct a picture, on which the structure of the fiber optical bundle cross section is not superimposed. To this end, the size of the grid field areas 6 should match somewhat the cross sectional area of the fiber.

If the dimensions of the grid fields 6 correspond to the sensor elements of the output sided camera, one obtains the picture reconstruction described above by reproducing the optical fibers 2 in the launching sided arrangement, whereby the individual fiber cross sections can be recognized in the representation of the picture.

If the optical fibers 2 on the launching side 2 are packed non-ideally that is with gaps, the results are picture defects. Then parts of the picture to be coupled in are not received by the fiber optical bundle 1. The cause of this defect can be determined with ease, since the launching sided coordinates of all of the optical fibers 2 are known and thus it is also known in which regions of the launching side 3 the optical fibers 2 are packed non-ideally. When a picture is reproduced, such a region is supplemented. This can be done, for example, in that the picture elements in this region obtain a gray tone that corresponds to the average of the gray tones of the adjacent picture elements.

List of Reference Numerals 1 fiber optical bundle
2 optical fiber
3 launching side
4 output side
5 grid
6 grid field

We claim:

1. Process for reconstructing a picture, coupled into a fiber optical bundle, which exhibits a launching side and an output side and is made of optical fibers, whereby the launching side and the output side coordinates of each individual optical fiber are known and can be assigned to each other, wherein when the picture is coupled in, the output side is taken by a camera, exhibiting a sensor area with discrete sensor elements, wherein a grid, comprising grid fields that are connected together without any gaps, is laid over the launching side configuration of the optical fibers, wherein the gray tones, which are picked up by the sensor elements and relate to an optical fiber, are distributed in such a manner on the gird fields overlapping with this optical fiber that each of these grid fields obtains from a gray tone, whose average is formed via at least one part of the output side fiber cross section of said optical fiber, a gray tone percentage, which corresponds to the area percentage of the area, overlapped by the respective grid field, at the fiber cross sectional area, wherein a grid field gray tone is found by adding all of the gray tone percentages of a grid field, and wherein the grid with the grid field gray tones is reproduced via a video screen.

2. Process, as claimed in claim 1, wherein first a gray tone, whose average is formed via at least one part of the output side fiber cross section, is determined in order to distribute the gray tones, which are picked up by the sensor elements and relate to an optical fiber, on the grid fields overlapping with the optical fiber; and the gray tone percentages of the grid fields are defined as fractions of the averaged gray tone, whereby such a fraction is given by the quotient from the area, overlapped by the respective grid field, to the total fiber cross sectional area.

3. Process, as claimed in claim 2, wherein a grid field area is chosen whose amount corresponds to the cross sectional area of the fiber.

4. Process, as claimed in claim 3, wherein the gray tone of the dark spots generated on the launching side by a non-ideal packing of the optical fibers is increased.

5. Process, as claimed in claim 3, wherein during reproduction on the video screen one grid field corresponds exactly to one picture element.

6. Process, as claimed in claim 2, wherein the grid comprises grid fields, whose size and shape correspond to the sensor elements in consideration of the reproduction scale.

7. Process, as claimed in claim 6, wherein the gray tone of the dark spots generated on the launching side by a non-ideal packing of the optical fibers is increased.

8. Process, as claimed in claim 6, wherein during reproduction on the video screen one grid field corresponds exactly to one picture element.

9. Process, as claimed in claim 2, wherein the gray tone of the dark spots generated on the launching side by a non-ideal packing of the optical fibers is increased.

10. Process, as claimed in claim 2, wherein during reproduction on the video screen one grid field corresponds exactly to one picture element.

11. Process, as claimed in claim 1, wherein the individual gray tones, which are picked up by the sensor elements and relate to an optical fiber, are assigned directly to the grid fields overlapping with this optical fiber; and the gray tone percentages of the respective grid fields are determined by adding the gray tones assigned to the respective grid fields.

12. Process, as claimed in claim 11, wherein a grid field area is chosen whose amount corresponds to the cross sectional area of the fiber.

13. Process, as claimed in claim 12, wherein the gray tone of the dark spots generated on the launching side by a non-ideal packing of the optical fibers is increased.

14. Process, as claimed in claim 12, wherein during reproduction on the video screen one grid field corresponds exactly to one picture element.

15. Process, as claimed in claim 11, wherein the gray tone of the dark spots generated on the launching side by a non-ideal packing of the optical fibers is increased.

16. Process, as claimed in claim 11 wherein during reproduction on the video screen one grid field corresponds exactly to one picture element.

17. Process, as claimed in claim 1, wherein the gray tone of the dark spots generated on the launching side by a non-ideal packing of the optical fibers is increased.

18. Process, as claimed in claim 17, wherein during reproduction on the video screen one grid field corresponding exactly to one picture element.

19. Process, as claimed in claim 1, wherein during reproduction on the video screen one grid field corresponding exactly to one picture element.

* * * * *